No. 635,485. Patented Oct. 24, 1899.
R. L. L. HUNDHAUSEN.
JUNCTION BOX FOR ELECTRICAL CONDUCTORS.
(Application filed June 26, 1899.)
(No Model.) 3 Sheets—Sheet 1.
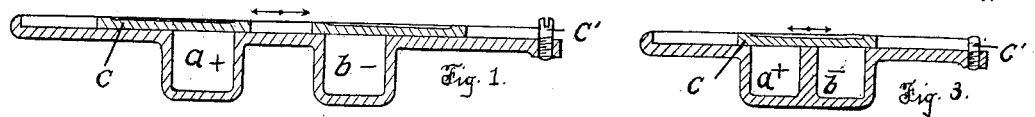
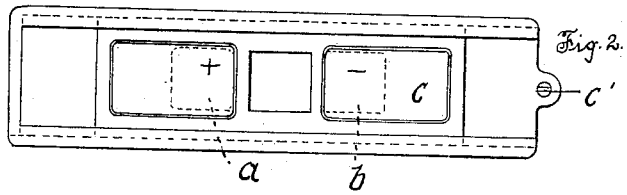
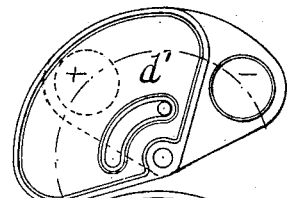
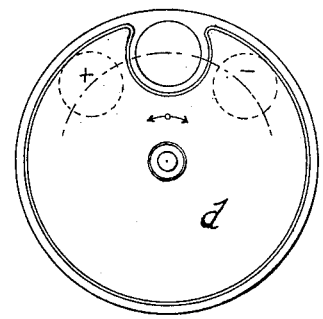
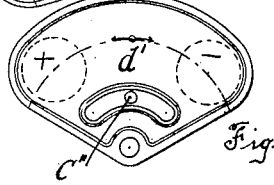
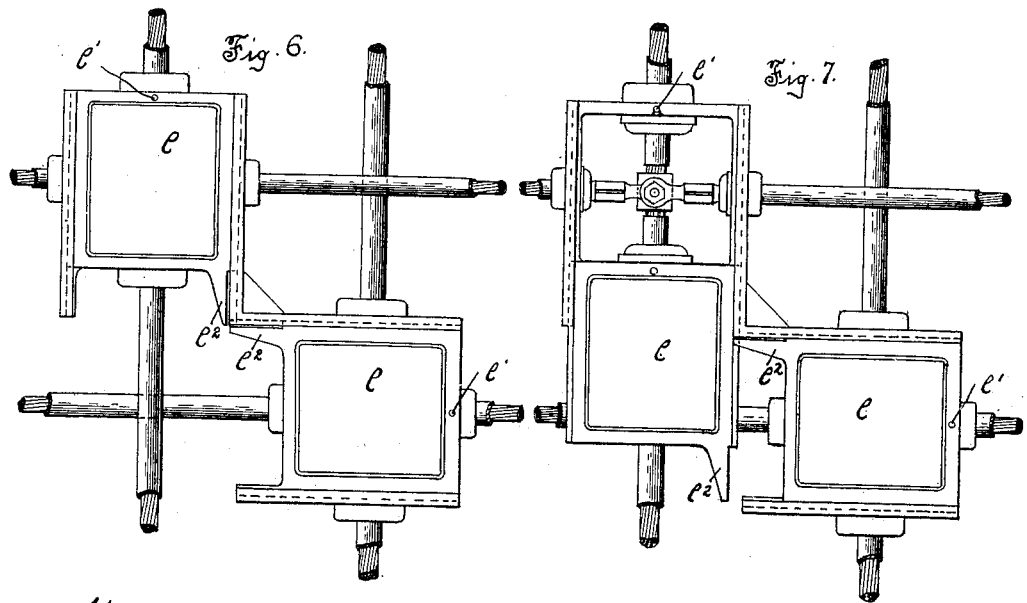
Witnesses
Max Gabel
C. B. Hubert
Inventor
R. L. L. Hundhausen
By Charles A. Brown & Cragg
Attorneys.

No. 635,485. Patented Oct. 24, 1899.
R. L. L. HUNDHAUSEN.
JUNCTION BOX FOR ELECTRICAL CONDUCTORS.
(Application filed June 26, 1899.)
(No Model.) 3 Sheets—Sheet 2.

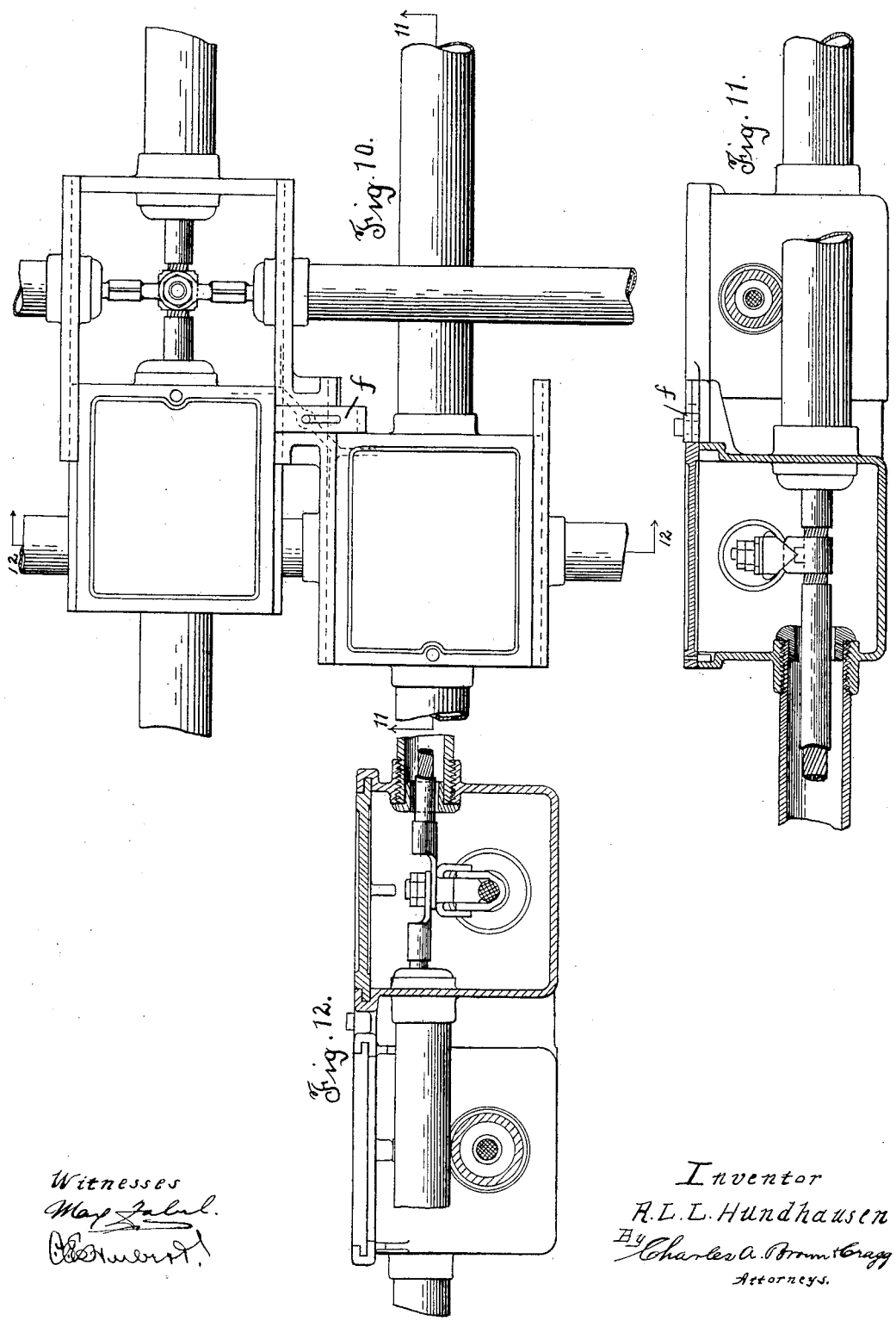

UNITED STATES PATENT OFFICE.

RUDOLF LOUIS LEOPOLD HUNDHAUSEN, OF WILMERSDORF, GERMANY, ASSIGNOR TO THE SIEMENS & HALSKE ELECTRIC COMPANY OF AMERICA, OF CHICAGO, ILLINOIS.

JUNCTION-BOX FOR ELECTRICAL CONDUCTORS.

SPECIFICATION forming part of Letters Patent No. 635,485, dated October 24, 1899.

Application filed June 26, 1899. Serial No. 721,961. (No model.)

*To all whom it may concern:*

Be it known that I, RUDOLF LOUIS LEOPOLD HUNDHAUSEN, a subject of the Emperor of Germany, residing at Wilmersdorf, near Berlin, Germany, have invented a certain new and useful Improvement in Junction-Boxes for Electrical Conductors, (Case No. 198,) of which the following is a full, clear, concise, and exact description, reference being had to the accompanying drawings, forming a part of this specification.

My invention relates to improvements in junction-boxes for electrical conductors, and has for its object the provision of means for preventing short circuits between the exposed terminals of different polarities.

It is not often feasible in electrical practice to renew or maintain an insulating-covering upon the terminal parts, and when such form of insulation is attempted the constant removal and replacing of the insulating material reduce its efficiency, so that the insulation can rarely be relied upon. My invention is equally applicable to branch conductor-boxes wherein practically the same conditions exist—namely, requiring that frequent access be had to the main and auxiliary conductors, with the necessity of making short circuits between conductors of different potential an impossibility. I have therefore provided means in the junction and branch conductor-boxes constructed in accordance with my invention whereby the covers or lids of such boxes are constructed to permit of access to the terminals of but a single polarity at one time.

Varying forms of apparatus embodying my invention are herein illustrated, which embodiments comprise a plurality of terminal compartments having a cover or covers which by appropriate construction or interlocking mechanism prevent the accidental short-circuiting of the energized conductors of the system.

My invention will be more readily understood by reference to the accompanying drawings, wherein—

Figure 8:
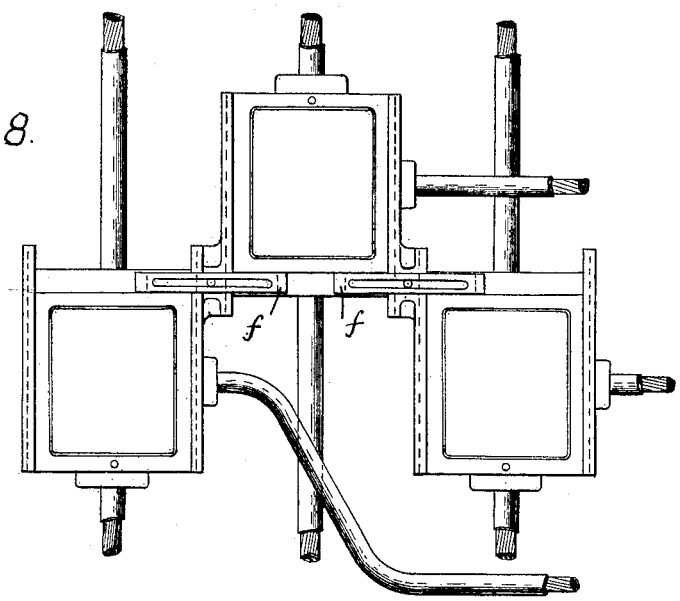
Figure 9:
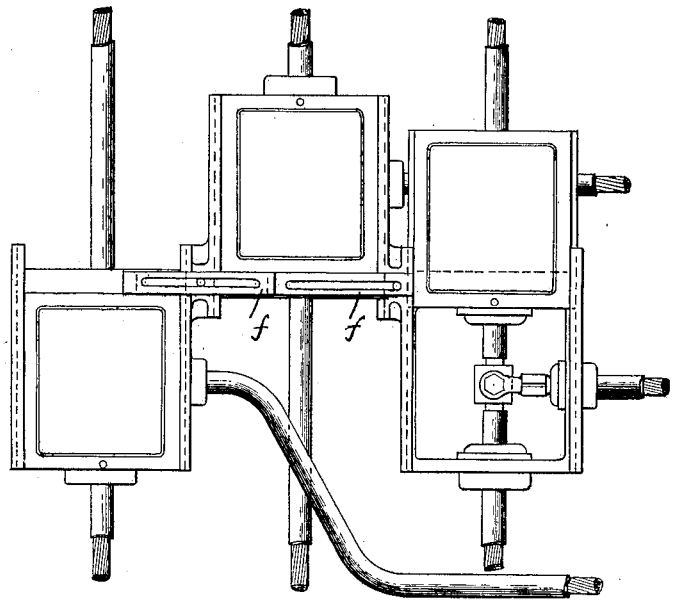

Figure 1 is a cross-sectional view of a two-compartment junction-box provided with a single sliding cover. Fig. 2 is a plan view thereof. Fig. 3 is a cross-sectional view illustrating a modification of the above construction. Fig. 4 illustrates a circular junction-box provided with a rotatable cover. Fig. 5 shows a modification thereof wherein the cover is adapted to be rotated through a small arc, the movement being limited by a stop. Fig. 6 illustrates two junction-boxes provided with interlocking sliding covers. Fig. 7 illustrates the same with one of the boxes open. Fig. 8 illustrates three junction-boxes provided with interlocking covers adapted to be used in connection with a three-wire system of distribution. Fig. 9 illustrates the same with one of the covers open. Fig. 10 illustrates a modification of the construction shown in Fig. 8 adapted to be used in connection with a three-wire system employing a grounded middle conductor. Fig. 11 is a cross-sectional view of the above; and Fig. 12 is another cross-sectional view of Fig. 10, taken at right angles to that of Fig. 11.

The same letter of reference is used to designate like parts in each of the several figures of the drawings.

The junction-boxes herein illustrated preferably are formed of cast-iron or other suitable material in a well-known manner and are connected with the metallic pipes inclosing the insulated conductors. The boxes preferably are lined with any suitable insulating material, such linings making the danger of short circuits with the earth or with a middle wire more remote than was otherwise obtainable. It is not advisable, however, to construct the entire box of insulating material, since in many cases the pipes and boxes may be employed as a middle conductor and other means for maintaining the conductivity of the junction-boxes would be required. It will be understood that the several main and branch conductors of like polarity are led into the several compartments or boxes and there connected in a manner well known to those skilled in the art.

The boxes illustrated in Figs. 1, 2, and 3 are provided with compartments $a\,b$, adapted to receive the terminals of the positive and negative conductors. A sliding cover $c$ is provided, which is prevented from being withdrawn from its sliding ways by a stop $c'$.

In the form illustrated in Figs. 1 and 2 a central opening is provided in the cover, which may be moved alternately to register with compartment a or b, thereby permitting access to one or the other of the exposed terminal parts.

In the form illustrated in Fig. 3 the cover is constructed of such a length as completely to close both compartments when in a middle position, while preventing access to one compartment when the other is open.

In Fig. 4 the cover d is rotatable in either direction upon a central pivot, the cover being provided with a single opening, which is made to register with any one of a plurality of circularly-disposed compartments.

The box shown in Fig. 5 is provided with a rotatable cover $d'$, adapted to be turned upon its pivot to expose either one or the other of the compartments a b, a stop $c''$, extending through a segmental slot, serving to limit the movement of the cover.

In the form of apparatus shown in Figs. 6 and 7 the boxes containing the terminals of opposite polarity are disposed substantially at right angles to each other, the covers e being provided with stops $e'$ and rearwardly-extending ears $e^2$, which serve, respectively, to limit the movement of the cover which is opened and prevent the movement of the opposing cover. The interdependence of these covers is illustrated clearly in Fig. 7, wherein the left-hand cover is open, stop $e'$ preventing its removal from the box, while the ear $e^2$ or body of said cover engages the extended ear upon the opposite cover and prevents its movement until the first-named cover is again restored to its initial position.

In Figs. 8 and 9 a plurality of junction or branch conductor-boxes for a three-wire system are illustrated, wherein a modified construction for securing the interlocking of the covers is employed. Instead of providing rearwardly-extending ears upon the said covers, as described above, the covers are disposed to move parallel to one another, and slotted slides $f$ of triangular cross-section are mounted in a similar groove upon the connecting-frame of the boxes, which are adapted to be moved to any one of three different positions, permitting a corresponding cover to be opened while the remainder are temporarily locked in position. This will be more readily understood after consulting Fig. 9, wherein the slides have been moved to the left to permit of opening the junction-box upon the right-hand side of the figure. The slides are thus in position to permit any movement of the other two covers.

Figs. 10, 11, and 12 illustrate a slight modification of the apparatus in the two preceding figures and embody a simpler construction for securing the interdependent operation of two sliding covers closing a two-compartment box. It will be understood that the boxes serve electrically to connect the inclosing metallic pipes or conduits of the system, the same being designed for the grounded middle conductor of a three-wire system. In this instance the slide $f$ has but a limited movement in either of two directions, serving to release one cover and lock the other, as previously explained. The arrangement just described is especially advantageous in that it offers the greatest possible safety in systems which have lately been placed in use employing the continuous-current three-wire system with a grounded middle conductor operating with a potential of from two hundred to two hundred and twenty volts. The pipes, with the connecting-body of the junction-boxes, admirably and economically serve as the grounded middle conductor.

A brief consideration of the description of the apparatus herein illustrated will show that the closure device provided upon each of the several junction-boxes is adapted to permit access to but a single compartment at one time, thereby doing away with all liability of short-circuiting the exposed portions of the conductors contained within the compartments. I have illustrated varying forms of interlocking apparatus in Figs. 6 to 12, inclusive, wherein either a portion of the cover itself or a separate part is provided for maintaining the opposing cover or covers closed while one is open.

I have described and illustrated my invention and several modifications thereof, but I do not desire to be understood as limiting myself to the precise embodiment of apparatus herein set forth.

Having, however, described structures containing my invention, I claim as new, and desire to secure by these Letters Patent, the following:

1. In apparatus of the class described, the combination with two compartments to which are led respectively the conductors of an electrical system of distribution of different polarity, of a closure device normally maintaining the said compartments closed, and means for securing its movement to permit of gaining access alternatively to either of said compartments, substantially as described.

2. In apparatus of the class described, the combination with a plurality of compartments wherein are respectively led conductors of a system of electrical distribution of different polarity, of a sliding closure device adapted normally to cover the said compartments, and means for permitting the said closure device to be moved, whereby access may be had to any one of the compartments while the remainder are maintained closed, substantially as described.

3. The combination, in apparatus of the class described, with compartments a b containing respectively the conductors of negative and positive polarity, of sliding covers normally maintaining the said compartments closed, and an interlocking appliance associated with said covers adapted to permit of the opening of but one of the compartments at a time, substantially as described.

4. The combination, in apparatus of the class described, with compartments $a\ b$ containing respectively the conductors of opposite polarity, of covers normally maintaining the said compartments closed, and a slide $f$ associated with the said covers adapted to be moved to either of its alternative positions, whereby one or the other of said compartments may be opened and the other securely locked, substantially as described.

5. In apparatus of the class described, the combination with compartments $a\ b$ wherein are respectively disposed the electrical conductor-terminals of opposite polarity, of movable closure apparatus adapted normally to maintain the said compartments closed, and means for securing the interlocking movement of the said covers, whereby one compartment is maintained closed while the other is open, substantially as and for the purpose described.

6. In apparatus of the class described, the combination with compartments $a\ b$ respectively containing the terminal-conductors of opposite polarity, of sliding covers $e$ normally maintaining the said compartments closed, and sliding parts associated with the said covers adapted to secure an interlocking action, and maintain one compartment closed while the other is open, substantially as described.

7. The combination, in apparatus of the class described, with compartments $a\ b$, of sliding covers $e$ normally closing the said compartments and moving in ways substantially parallel, and a slide $f$ movable at right angles thereto adapted normally to engage either of the said covers, the said slide being movable to one or the other of its extreme positions, whereby the corresponding cover may be opened and the other one securely locked, substantially as described.

8. In apparatus of the class described, the combination with a plurality of compartments adapted respectively to receive the conductors of like polarity of a system of distribution, of sliding covers $e$ normally closing the said compartments, said covers moving in ways substantially parallel, and slide $f$ disposed before the said sliding covers having alternative positions, whereby only one of the covers may be opened at a time, substantially as described.

9. In apparatus of the class described, the combination with compartments $a\ b$ respectively containing terminal parts of opposite polarity, of a closure device normally maintaining the said compartments closed, and a mounting for the said closure device permitting its movement, whereby one of the compartments is opened and the other one is maintained closed, substantially as and for the purpose described.

In witness whereof I hereunto subscribe my name this 7th day of June, A. D. 1899.

RUDOLF LOUIS LEOPOLD HUNDHAUSEN.

Witnesses:
    HENRY HASPER,
    WOLDEMAR HAUPT.